(No Model.)
A. W. COLWELL.
VACUUM PAN.
No. 330,209. Patented Nov. 10, 1885.
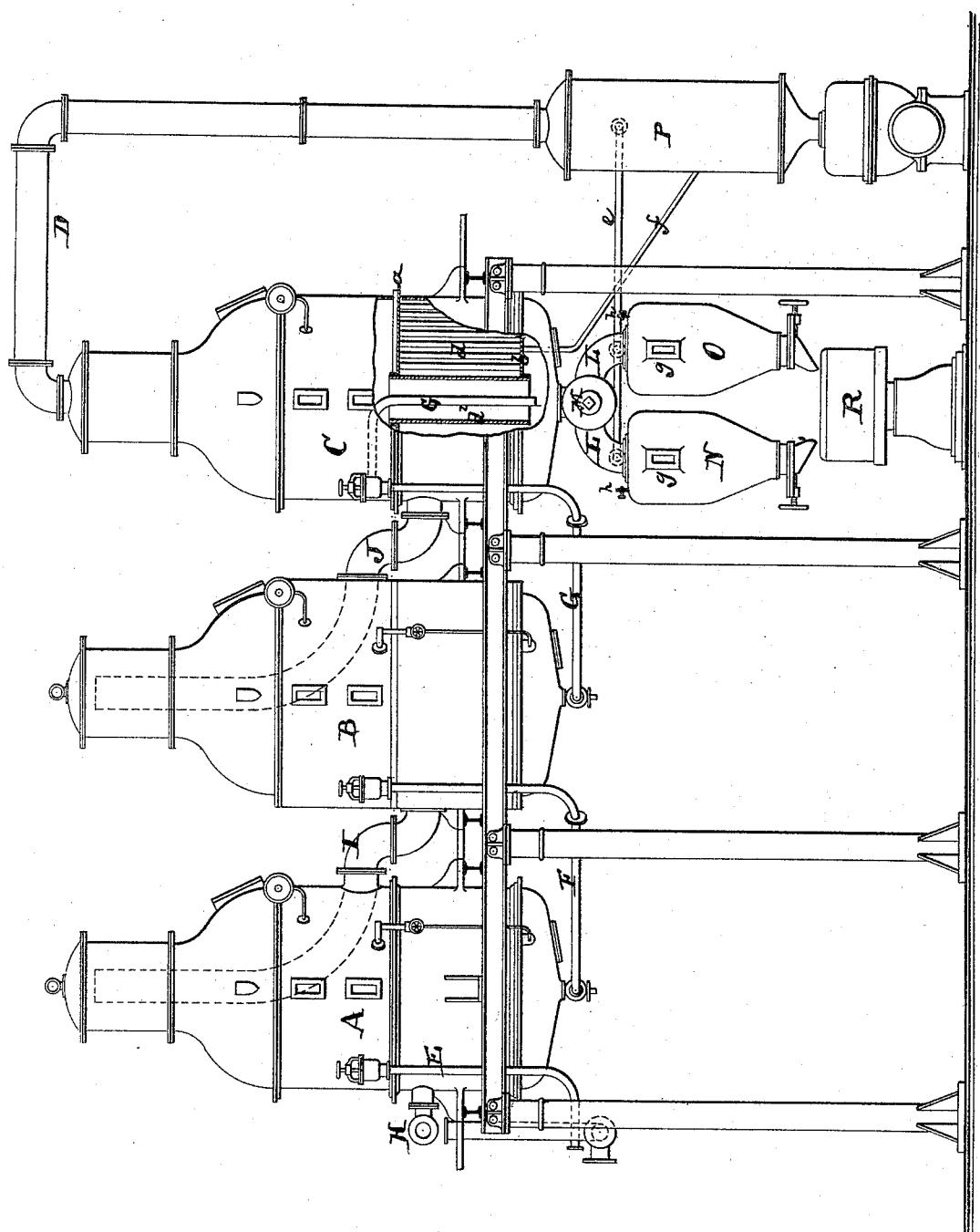
Witnesses:
A. Schehl.
[signature]
Inventor:
A. W. Colwell
by Briesen & Steel
Attorneys.

UNITED STATES PATENT OFFICE.

AUGUSTUS W. COLWELL, OF NEW YORK, N. Y.

VACUUM-PAN.

SPECIFICATION forming part of Letters Patent No. 330,209, dated November 10, 1885.

Application filed April 10, 1885. Serial No. 161,778. (No model.)

*To all whom it may concern:*

Be it known that I, AUGUSTUS W. COLWELL, a resident of New York city, in the county and State of New York, have invented an Improved Apparatus for Evaporating Brine, of which the following is a full, clear, and exact description, reference being made to the accompanying drawing, which represents an elevation partly in section, of my improved apparatus.

The object of this invention is to evaporate brine *in vacuo*, so as to obtain crystals of salt of different sizes and hardness by the vacuum process, and also that the process may be carried on without interruption, burning, or coloring.

The invention comprises the employment of one or more vacuum-pans with circulating contrivances and heating mechanism, in combination with a discharge mechanism, into which the crystals can be discharged from the vacuum-pan without at any time interrupting the process of evaporation.

With reference to the drawing, the letters A, B, and C represent three vacuum-pans. A larger or smaller number of such pans may of course be employed. The pan C connects by the tube D with the exhaust mechanism by means of which the vacuum is created in said pan, and where there are a number of vacuum-pans in connection, as in the drawing, the pan which is nearest the tube D will have the greatest vacuum and boil with least heat. Thus in the example shown the pan A would have three inches vacuum, the pan B a vacuum equal to fifteen inches, and the pan C a vacuum of twenty-seven inches.

The brine to be evaporated is introduced into the pan A through a pipe, E. The non-vaporized portion of the brine passes from the pan A through the pipe F into the pan B. The non-vaporized portion of the brine passes from the pan B, through the pipe G into the pan C. The lower part or heating-surface of the pan A receives steam at the temperature of about 222° Fahrenheit from a pipe, H. The vapors which are generated within the pan A pass from the upper portion thereof through a pipe, I, into the heating-surface of the pan B. The vapors which are generated in the pan B pass from the upper portion thereof through a pipe, J, into the heating-surface of the pan C. The vapors that pass from A to B have a temperature of about 200° Fahrenheit, those passing from B to C 175° Fahrenheit. Thus the pan having the least vacuum has the greatest heat, while that having the greatest vacuum has the least heat. The vapors that escape from the pan C through the pipe D have about 130° Fahrenheit.

In each vacuum-pan the vapors that are to heat its contents enter a space between two diaphragms, $a$ and $b$, which space is traversed by upright pipes $d$. Through these upright pipes the brine is free to circulate. The brine reaches the lower part of each pan through the downwardly-extending portion of the brine-supply pipe. This is shown with reference to the pipe G on the pan C in the drawing, which pipe G passes through a larger open-ended downtake-pipe, $d^2$, that connects the diaphragms $a$ and $b$. Thus in each pan the brine is boiled in vacuum, and thereby relieved of its vaporized constituents, the crystals floating in the saturated solution, and in this condition they are conveyed in the pipe F from the pan A to the pan B, in the pipe G from the pan B to the pan C. The bottom of the last pan, C, communicates with a forked discharge-pipe, L, which has a three-way cock, M. The branches of the pipe L communicate, respectively, with the upper ends of two chambers, N and O. The lower ends of these chambers have drop-gates for discharging their contents. Their upper ends, or the branch pipes L L, communicate by a pipe, $e$, with a condenser, P, which is an enlargement of the pipe D and part thereof. A pipe, $f$, carries the products of condensation of the heating-chamber of the pan C off into the condenser P.

Through the pipe E a saturated solution—that is, brine—is introduced into the pan A, beneath the diaphragm $b$ thereof, so that such solution may circulate through the pipes $d$ of the pan A. At the same time steam enters around these pipes $d$ of the pan A through the pipe H. Immediately crystals begin to form; but these crystals, instead of accumulating in the lower part of the pan A, are, by the strong ebullition which is caused by the upward action in the small tubes $d$, kept afloat above the diaphragm $a$ until they descend through the larger downtake-pipe $d^2$, when they reach the pipe F. As this pipe F is always open, and as the vacuum on the side of the pan B is more powerful than on the side of the pan A, the tendency of the crystals will be to follow the flow of the brine, and to be deposited therefore in the second pan, B. Here the action is entirely the same as it was in the pan A; but a great many more crystals are formed, the liquor remaining of the same density, it being a saturated solution. Finally, the crystals of salt pass through the pipe G into the third pan, C.

In order now to get rid of the crystals that are finally formed in the pan C without interfering with the continuity of the process that is going on in the pans, I have arranged the forked pipe L and the chambers N O, the latter being placed above a receiving-vat, R. The vessels N O also contain brine of the same density as that in the pans; but when the valve M is opened to make one of these two vessels communicate with the pan C the specific gravity of the crystals and their momentum through the downtake cause the crystals to pass through the valve into such receiver, and here, the liquor being quiet, they sink, and as they accumulate the mother-liquor is forced upward through the pipe L into the body of the third pan, C. This deposit goes on in one of these receivers N O until the same is about filled with crystals, which can be seen by eyeglasses or sight-holes in the side of the vessel, as indicated at $g\ g$. When one of these vessels is full, the cock M is turned to cut off the full receiver and establish communication between the other receiver and the pan C, a vacuum being always formed in the empty receiver N O by the connection $e$ with the condenser P.

While the second receiver, N or O, is being filled, an air-cock, $h$, is opened in the full receiver, so as to admit air thereto, whereupon the discharge-gate at the bottom of such full receiver may be opened to draw off the crystals, with whatever mother-liquor may be with them, into the vat R, which may be part of a suitable centrifugal machine to purge off the mother-liquor, leaving the salt in a comparatively dry state.

As soon as the receiver has been emptied, its bottom gate is closed, also the cock $h$, its pipe $e$, connecting it with the condenser P, is reopened, the air exhausted from it, and the same is then in condition to receive a new charge from the pan C.

It is proposed to operate the first pan of the multiple set of pans by using exhaust-steam at, say, five-pounds pressure, which is equal to about 222° Fahrenheit, and have in the upper portion of the same pan a vacuum of about five inches, which is equal to about 200° Fahrenheit, the difference in temperature being amply sufficient to boil the brine rapidly. The vapor resulting from boiling in this vessel A is passed over to the heating-surface of the second pan, B, where we have about ten inches of vacuum and about 175° temperature in the boiling part, the difference in heat being sufficient to boil this vapor, while the resultant vapor goes over to the third vessel, C, where we have about twenty-seven inches of vacuum in the boiling part. The resultant vapor from this passes to the condenser P by pipe D, and is there condensed by an injection of cold water. This water, together with any gases, vapors, or air that may enter, is drawn off by means of the vacuum-pump.

By means of the multiple effect above described I take advantage of the latent heat which is in the vapors, and I find that by the means above described I can evaporate brine at from one-fifth to one-eighth the present expense of evaporating it.

I claim—

1. The combination of one or more vacuum-pans with the forked discharge-pipe L, cock M, and receiving-vessels N O, all arranged to allow either one of the receiving-vessels to be brought in communication with the pan, as specified.

2. The combination of the vacuum-pan C with the vapor-inlet pipe J, diaphragms $a\ b$, and circulating-pipes $d\ d^2$, with the brine inlet pipe G, forked brine-discharge pipe L, having cock M, receivers N O, air-cocks $h\ h$, pipes $e\ f$, vacuum-pipe D, and condenser P, substantially as herein shown and described.

AUGUSTUS W. COLWELL.

Witnesses:
GUSTAV SCHNEPPÉ,
HARRY M. TURK.